US005319475A

United States Patent [19]

Kay et al.

[11] Patent Number: 5,319,475

[45] Date of Patent: Jun. 7, 1994

[54] TAMPER RESISTING HOLOGRAPHIC SECURITY SEAL

[75] Inventors: Ralph Kay, Berkshire, England; Keith A. Jones, Berkshire; Adam J. Silk, Hants, both of United Kingdom

[73] Assignee: De la Rue Holographics Limited, London, England

[21] Appl. No.: 937,894

[22] PCT Filed: May 22, 1991

[86] PCT No.: PCT/GB91/00809

§ 371 Date: Oct. 22, 1992

§ 102(e) Date: Oct. 22, 1992

[87] PCT Pub. No.: WO91/18377

PCT Pub. Date: Nov. 28, 1991

[30] Foreign Application Priority Data

May 22, 1990 [GB] United Kingdom ................. 9011457

[51] Int. Cl.[5] .......................... G03H 1/00; B41M 3/14; G09F 3/03

[52] U.S. Cl. ........................................ 359/2; 428/913; 428/915; 283/86; 283/108

[58] Field of Search ....................... 283/86, 108; 359/2, 359/1, 3; 428/913, 915, 916

[56] References Cited

U.S. PATENT DOCUMENTS

| | | | |
|---|---|---|---|
| 4,268,983 | 5/1981 | Cook | 40/630 |
| 4,608,288 | 8/1986 | Spindler | 428/915 |
| 4,834,552 | 5/1989 | Makowka | 383/5 |
| 5,145,212 | 9/1992 | Mallik | 359/2 |

FOREIGN PATENT DOCUMENTS

| | | |
|---|---|---|
| 1151039 | 1/1958 | France . |
| 2445568 | 12/1979 | France . |
| 2211760A | 7/1989 | United Kingdom . |
| WO89/08586 | 9/1989 | World Int. Prop. O. . |

OTHER PUBLICATIONS

Patent Abstracts of Japan, vol. 12, No. 354, (P-761) [3201] 22 Sep. 1988 and JP, A, 63106780 (Toppan Printing Co.) 11 May 1988.

*Primary Examiner*—Loha Ben
*Assistant Examiner*—John Juba, Jr
*Attorney, Agent, or Firm*—Oliff and Berridge

[57] ABSTRACT

A tamper resistant security seal is a laminated tape having a transparent carrier layer (2); an optical, diffraction pattern defining layer (3,4); and an adhesive layer (6) for adhering the tape to a substrate. The optical pattern, such as a hologram, defined by the optical pattern defining layer is visible from outside the laminate. The optical diffraction pattern defining layer (3) is formed by a polymeric layer permanently bonded to the transparent carrier layer which, when heated, causes the diffraction pattern to undergo an irreversible change. The adhesive is a pressure sensitive adhesive. An additional removable support layer may be provided on the carrier. The laminate is constructed so that a reduction in temperature below 0° C. will cause an irreversible change in the diffraction pattern, or is such that subsequent to such a temperature reduction, attempted removal of the tape from a substrate will cause an irreversible change in the diffraction pattern.

28 Claims, 3 Drawing Sheets

TAMPER RESISTING HOLOGRAPHIC SECURITY SEAL

BACKGROUND

1. Technical Field

The invention relates to a tamper resistant security seal, for example for sealing containers such as security pouches and the like which are used for conveying items of value such as banknotes, letters of credit and the like.

2. Description of the Prior Art

It is extremely important that any such pouches possess tamperproof or tamper-evident seals. Various attempts have been made in the past to make such seals.

Generally these seals are adhesive backed tape constructions which are applied under or over the edge of the pouch flap so that the flap is held in place against the body of the pouch in a firm and tamperproof manner. They can also be in the form of labels.

In recent years the use of metallised films has been replaced by the use of optically embossed metallised films, which have a holographic or diffractive image. Such a construction was recently described by Advanced Holographics in GB-A-2211760. The advantage of using holographic films is that their counterfeiting is extremely difficult. The construction of the general purpose tape is similar to tapes used for hot stamping, for example as described in GB-A-2129739.

Very generally these tapes consist of a supporting film, a wax release layer, and a coating of an embossable thermoplastic polymer which has been subsequently diffractively embossed. Vapour deposited aluminum is then applied with an optional protective layer. The adhesive is then applied from a coating solution. WO-A-88/05728 introduces the general concept of a holographic protective film having a wax interlayer. Then a general purpose pressure sensitive adhesive layer is applied which is in turn protected by a peelable release paper. In use, the tape is fixed to a substrate using the adhesive. It is difficult to copy or alter.

JP-A-63106780 also describes another general purpose holographic tape. The tape is designed with weaker bonding between a protective layer over the holographic layer and an adhesive layer than between a transparent film on which the tape is formed and the holographic layer.

Similar constructions are known for covering large areas of, say, carton card in which an holographic transfer foil is rolled onto the card to produce a card having a diffractive metallic appearance. Such transfer foils are not known to have been used for security pouch seals. However, they are of similar structure to the tapes mentioned above except that instead of a wax release layer the embossable layer is chosen to have release properties from the carrier film.

Searle (GB-B-2136352) discloses holographic seals in which locally embossed areas of thermoplastic polymer are covered by a metallised film which is then demetallised. This leaves areas which are unprotected by the holographic image which is undesirable in case forgery is attempted.

Dai Nippon Insatsu in U.S. Pat. No. 4,856,857 discloses transparent embossed holographic structures in which the holographic impression is supplemented by a partial appearance of the underlying surface which may be a photograph.

Makowka (U.S. Pat. No. 4,834,552) describes making tamper-evident seals for plastic envelopes. The seal is double sided requiring two adhesives and is concealed under the flap in use. Inspection of tamper evidence can only be by folding back the flap and looking at the edges. Paper or cloth having a porous structure is used to protect against low temperature attack.

The use of holographic effects for security purposes is thus well known. The fineness of optical embossing and the nature of the holographic image make it very difficult to alter such devices or manufacture them afresh.

The term "counterfeiting" may be taken to mean the copying of an article by fresh but fraudulent manufacture.

Holographic devices are counterfeit resistant and may be counterfeit indicating. It is relatively difficult to construct an holographic image by "copying" it on a holographic table even if one were available. Slight variations in image quality would also be readily detected in any copy because of the fineness of the surface relief structures employed. The counterfeiter would need to have access to holographic equipment, embossing equipment and metallising equipment to manufacture copies, in practice this would be very difficult.

Holographic seals are also forgery resistant by which is meant alteration resistant. They are also readily alteration indicating, as it is very difficult for a forger to replace accurately any cut away or altered area: the fineness of optical relief embossing acts as a considerable deterrent.

Despite many holographic seal variants disclosed in the art, these all being directed towards enhancing in various ways the anti-counterfeiting properties and/or anti-forgery properties, the importance of providing substitution resistance, which is the third form of attack which a criminal may make, has not hitherto been maximised.

The prior art recognises that holographic seals should not be readily detachable from the substrate to which the seals are attached. Thus for example it is recognised in GB-B-2136352 that the holographic layer should be weak so that attempted removal of the carrier will destroy the holographic embossing.

Similarly in GB-A-2211760 the removal of the carrier film (aided by the strength of the wax it is assumed) will cause damage to the holographic layers.

While such structures have been used previously, they are unlikely to have provided substitution prevention or tamper prevention and possibly tamper indicating properties for example when such substitution or tampering is undertaken at extremes of ambient temperature during freezing or heating. Neither is there any indication in the prior art as to how a superior holographic tape possessing such properties may be made.

By substitution is meant the detachment of all or part of the seal allowing its replacement without giving evidence of that having happened. For example if a seal on a security pouch could be temporarily detached and then resealed without trace, this would be particularly undesirable. Yet many of the prior art seals are susceptible to such action.

By tampering is meant unauthorised interference with the seal whether for the purposes of counterfeiting, forgery or substitution.

In this specification, by printing is meant the application of readable markings of dyes and/or pigments such as those delivered during printing operations, especially thin ink film printing operations such as occur in lithographic, flexographic and gravure printing. The marking may be employed under electronic control such as during laser printing of toners, ink jet printing, thermal transfer printing, impact ribbon printing and the like. Markings may take the form of fine line security indicia, such as alpha numerical characters, symbols, geometrical designs, obliterating coatings and the like.

Markings may also be made caused by printing small shapes which pattern the embossed surface before or after metallisation or by gross embossing number shapes. The printed markings a take the form of single images which may require registration for labels, or the printed markings may take the form of multiple repetitions of a particular design in the form of an endless pattern. Serial or batch numbering may be used to identify individual seals.

SUMMARY OF THE INVENTION

In accordance with a first aspect of the present invention a tamper resistant security seal comprises a laminate having a transparent carrier layer; an optical, diffraction pattern defining layer; and an adhesive layer for adhering the seal to a substrate, wherein an optical pattern defined by the optical, diffraction pattern defining layer is visible from outside the laminate, and wherein an attempt to tamper with the seal will cause an irreversible change in the optical pattern characterized in that the optical, diffraction pattern defining layer is formed by a polymeric layer; in that the optical, diffraction pattern defining layer is permanently bonded, directly or indirectly, to the transparent carrier layer, such that any attempt to delaminate the carrier from the optical, diffraction pattern defining layer will irreversably damage the optical pattern; in that the adhesive is a pressure sensitive adhesive; and in that the laminate is such that a reduction in temperature below 0° C. will cause an irreversible change in the optical pattern, or is such that subsequent to such a temperature reduction, attempted removal of the seal from a substrate will cause an irreversible change in the optical pattern.

The permanent bond between the carrier and optical pattern defining layer allows the layers to be kept very thin. Thus, any attempt to peel the layers apart will cause the optical pattern defining layer to fragment destroying the optical pattern.

The invention provides a security seal which exhibits a high degree of deterrance to each of counterfeiting, forgery and substitution attempts within an integrated structure which is suitable for manufacture on a large scale using conventional production equipment.

These new security seals, which are resistant to a wide range of criminal challenges, may be made with a structure which is so fragile that it will very readily fail.

We have realised that it is important to make an improved seal which has high resistance to counterfeiting, forgery and substitution, yet which will degrade irreversably and readily under many conditions to which the criminal may subject it.

We have devised a new type of tamper resistant security seal which is capable of resisting not only a high temperature challenge but also a challenge at low temperature. Such a challenge could result in complete destruction of the optical pattern defining layer, a variation in that optical pattern, or a variation in the laminate structure such that any attempt to remove the seal from a substrate will cause the optical pattern to be varied or destroyed. Preferably, the laminate is constructed so as to withstand a challenge at −50° C.

DETAILED DESCRIPTION OF THE INVENTION

The film forming carrier layer may comprise a Sun, Ault and Wiborg VHL16157 lacquer. This is preferably applied at 2 to 4 microns thickness from a first solvent/reverse roll using a coater. The composition may be a polyvinyl butyral and polyacrylate mixture in solvent. The film forming carrier layer has much more cohesive strength than the subsequently applied optical pattern defining layer and provides surface protection to a linear extent when there is no support. Additionally, the carrier is selected to bond securely to the subsequent coating and it contracts proportionally much more than the other layers on prolonged freezing to low temperatures such as by liquid nitrogen.

The optical pattern defining layer comprises a transparent film forming polymeric coating and a metallic layer provided on the surface of the polymeric coating remote from the carrier layer. The pattern comprises a transmission hologram or diffraction pattern which is viewed by reflection against a metallic surface.

To provide resistance to heat attack, the polymeric coating, such as an embossable lacquer, will typically have a Tg of below the boiling point of water but above ambient transporting conditions ie in the range 50° to 90° C. preferably 60° to 80° C. Embossing may occur at temperatures of 20° C. degrees above the Tg of the given lacquer.

For example, the optical pattern defining layer may be applied to the carrier layer at 4 to 12 microns dry thickness and comprise Holden's 3190 lacquer. The optical pattern defining layer will be thermoplastic and may have some elastomeric properties. Chemically it may be a polyurethane or a polyester which when applied to the carrier layer will exhibit significantly greater adhesion than that between the carrier layer and additional support layer.

The exposed side of this optical pattern defining layer is preferably embossed against a nickel or similar master shim, in order to impart optically diffracting characteristics.

A surface of the carrier layer or optical pattern defining layer may be printed or otherwise marked. The metallic layer is applied generally completely to the embossed surface, such that substantially all the embossed diffracting pattern is covered, and this layer may be of aluminium and for example be 20 nm thick. The metallic layer is preferably continuous but may alternatively be partial for example in a half tone pattern which may in turn depict larger shapes, the embossing normally covering the complete area of the seal. It is preferable that the embossed area extends over the complete surface without interruption.

At least one of the materials of the carrier and embossing layers is preferably susceptible to common solvents such that it will swell or dissolve on solvent challenge, often causing irreversable change to the delicate holographic layer. The use of alkali is likely to affect any aluminum reflector. The structure is preferably acid and water resistant.

The pressure sensitive transfer adhesive may comprise a National Adhesive Company pressure sensitive transfer adhesive. The adhesive must be a pressure sensitive adhesive preferably protected by a siliconised release paper, applied by transfer i.e. after drying it is rolled at ambient temperature under mild pressure against the remainder of the construction. The use of solvent borne pressure sensitive adhesives coated onto the metal is impossible because of solvent sensitivity of the embossable layer. Hot stamping adhesives cannot be used because of the inbuilt temperature sensitivity.

The release paper may be continuous, but is preferably releasable in more than one section. Generally the pressure sensitive adhesive is chosen to retain its adhesive properties over a temperature range of −10° C. to +60° C., preferably the range is from −50° C. to +60° C., and to have a Tg from 50° C. to 150° C. It is well known that general purpose pressure sensitive adhesives will harden during chilling, causing them to adopt a glassy state exhibiting no adhesion. Thus by providing an adhesive which retains its tack at low temperatures, freezing delamination can be avoided. Similarly adhesives may soften and thus be susceptible to heat delamination and become peelable.

Such adhesives may be obtained commercially from adhesive suppliers and suitability for particular applications may be tested experimentally so as to ensure a high degree of adhesion at the lowest temperatures to the substrate and to the metallic layer.

The pressure sensitive adhesives are generally made from polymers which have a high surface energy. While relatively pure polymers having a low Tg may be employed and the Tg may equate approximately to the change between tackiness and the non-tacky glass-like state, it will often be found that plasticising or tackifying agents may be incorporated with the polymer to render, it tacky at temperatures below the Tg of the polymer. Such tackifying agents may be non-volatile organic molecules having structual similarity to the polymer, or at least compatibility, or there may be included very low molecular weight polymers.

The pressure sensitive adhesives will generally be acrylic polmers and the like. Many examples may be found in the art.

The pressure sensitive adhesive should be chosen to maintain its tackiness for prolonged periods at the specified minimum operative temperature for a given application.

In some examples the seal further comprises a support layer joined to the carrier layer.

The support layer may, comprise a transparent film, for example biaxially oriented polyester film of the ICI plc type sold under the trademark "MELINEX". Its thickness will be typically 23 microns or 50 microns but could be very thin such as 12 microns. Generally the polyester will be colourless although it may be tinted. It may carry security printing or other markings on either surface if the support layer is intended to remain on the affixed seal. In other embodiments however the support layer may be stripped off from the remainder of the seal after it has been affixed to the pouch. The remaining layers are however usually too fragile to withstand much handling and usually the support layer is left in place. Its removal does not destroy the holographic layer in this embodiment. It must be left in place during affixing.

In accordance with a second aspect of the present invention a method of manufacturing security bags comprises providing a length of tamper resistant security seal according to the first aspect of the invention, the seal including a releasable, film forming protective layer over the adhesive layer, wherein the releasable, protective layer is releasable in more than one section, folding a length of security bag material to form a bag with an opening, removing one section of the protective layer, and affixing the length of security seal to one edge of the opening via the portion of the adhesive layer thereby exposed.

This is a particularly important aspect of the invention enabling security bags to be mass produced, as explained below.

In accordance with a third aspect of the invention, a tamper resistant security seal comprises a laminate having a transparent carrier layer; an optical, diffraction pattern defining layer; and an adhesive layer for adhering the seal to a substrate, wherein an optical pattern defined by the optical diffraction pattern defining layer is visible from outside the laminate, and wherein an attempt to tamper with the seal will cause an irreversible change in the optical pattern characterized in that the adhesive layer defines a pattern of areas with and without adhesive and in that the optical diffraction pattern defining layer is permanently bonded, directly or indirectly, to the transparent carrier layer, such that any attempt to delaminate the carrier from the optical, diffraction pattern defining layer will irreveribly damage the optical pattern;

Preferred seals are constructed according to both the first and third aspects of the invention.

In accordance with a fourth aspect of the present invention, a method of manufacturing a tamper resistant security seal comprises preparing a laminate of a carrier layer, optical diffraction pattern defining layer and metallic layer; and applying transfer pressure sensitive adhesive, supported on a releasable protective layer, under mild roller pressure.

The security seal is visible at all times, as distinct from being concealed under a flap or the like, to enable easier detection of tampering, and either remains intact or rapidly degrades on being subjected to a variety of attacks.

A new method of manufacturing such extremely delicate structures and methods of application have been devised such that the tape can be made using relatively conventional manufacturing equipment. Relatively inexpensive security products which incorporate the seals of the invention may also be made.

BRIEF DESCRIPTION OF THE DRAWINGS

An example of a seal and its use in the manufacture of security bags according to the present invention will now be described with reference to the accompanying drawings in which.

DESCRIPTION OF THE PREFERRED EMBODIMENT

Figure 1:
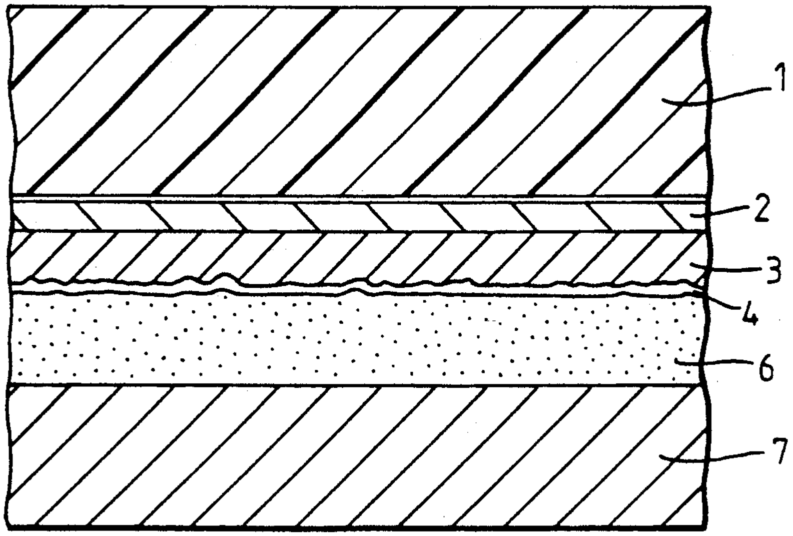
FIG. 1 is a schematic, cross-section not to scale of one embodiment of the seal.

The seal shown in FIG. 1 comprises a smooth transparent support 1 formed by a polyester film, biaxially oriented for strength, with a thickness in the range 12–50 microns. Typically 19 or 23 micron polyester film is used. This support I provides support for the remaining layers and can be removed. This removal can be done without damage to a holographic image embossed on a subsequent layer. The removal of the support 1 would be done only after the seal was affixed to its resting place as the construction is not otherwise self supporting. The support could be left in place and indeed would be left in place for many applications because it imparts scuff resistance to the seal. In its absence the holographic image could be irreversibly damaged during normal handling. The use of corona discharge treatment provides fine control of the bonding characteristics to a degree greater than wax could provide, so that a balance of properties may be achieved.

Instead of biaxially oriented polyethylene terephthalate (polyester) the support 1 may be made of a thermoplastic film material which has a lower Tg e.g. an ethylenic polymer such as polypropylene. Polypropylene has the advantage that it is easier to cut with a hot wire than paper or polyester. The support 1 may have printing on one or both surfaces or be tinted. Polymer surfaced paper may be used as a support provided its surface is relatively smooth: this would be subsequently removed. Corona treatment levels of 50 dynes per cm of polyester film will give a useful degree of releasable bonding to the preferred lacquer which is used, while balancing handling and security requirements.

A smooth transparent carrier film forming polymer 2 is coated on the support 1. The carrier 2 has intermediate release properties relative to the support 1 such that the support may be removed later without delaminating any of the layers in the construction.

The carrier 2 is coated very thinly indeed. The dry thickness limits, which are critical, are between 2 and 6 microns, preferably between 2 and 4. The carrier 2 is tougher than the embossable lacquer 3, which is useful for scuff resistance, but the carrier is less tough than the support 1. The carrier 2 can be cut with a hot wire as it is thermoplastic. The material is generally not as susceptible to attack from solvent as the embossable lacquer 3 but the combined differential solubility of the two layers provides a useful defence against solvent assisted tampering.

The relative adhesion between the carrier 2 and the support 1 is controlled by selection of the materials and also surface treatment of the support 1, such as with a corona discharge. Wax is not used as the bonding between the support 1 and the carrier 2 can be more easily and cost effectively controlled to make it release easily or not at all, depending on the corona setting. This of course is readily controllable.

The embossable lacquer 3 is applied to the carrier 2. The surface of this embossable lacquer 3 remote from the carrier 2 is embossed to define a diffraction pattern such as a hologram.

The dry thickness of the embossable lacquer 3 is from 4 to 12 μm and preferably 6 to 8 μm. It is thermoplastic and cuttable with a hot wire. Thermoset, highly crosslinked coatings are not used as they are too tough. Typically a non-crosslinkable polyurethane or polyester is chosen. Solvent soluble polymers are employed as they cannot withstand solvent attack later.

The embossable lacquer 3 is generally selected to have a Tg between 50° C. and 90° C. The lower limit is rather too low for hot countries but generally allows the embossable lacquer not to "melt" under normal working conditions. The higher limit is selected to be low enough to cause deterioration of the holograhic embossing pattern on hot air (hair drier) or steam challenge. If subjected to these temperatures the embossable lacquer 3 would relax and the holographic quality would deteriorate to a noticeable extent, providing tamper evidence.

Embossing takes place at a temperature such that the lacquer 3 permanently accepts the embossing pattern.

On solvent attack the embossable lacquer 3 which is soft and solvent soluble is quickly irreversibly damaged resulting in loss of holographic image quality. If heated with hot air or steam to a temperature above the softening point of the embossable lacquer (50° C. to 90° C.) the embossable lacquer 3 relaxes and the holographic properties degrade irreversibly.

The embossable lacquer 3 is embossed at a temperature as described above and under pressure and then metallised with a thin metallic film 4 of aluminum or other metal typically 20 μm thick. The embossable lacquer 3 may be metallised then embossed but this is not usually done in practice.

The holographic layers 3,4 are very thin and fragile. The seal can be handled well at room temperature provided that it is on its support 1. This is very important for automatic application of lengths of tape.

The embossable lacquer 3 may be metallised partially, balancing holographic reflectance and see-through transmission in this use. Transmissions of 75 to 80% are typical.

The embossed diffraction patterns can include holograms of objects, two dimensional graphical diffraction patterns (which give the perception of none or one or more layers of depth to the viewer) , stereoholograms, kinoforms, diffractive mosaic patterns including computer generated diffracting patterns and the like alone or in any combination. The images are preferably white light viewable. The images may be individual perhaps surrounded by plain metal or continuously repeating in register in an overall geometric design. The holographic features may alternatively be viewable only on monochromatic light including visible and infrared light. Machine readable and verifiable diffraction patterns may be included in the holographic embossing.

A protective polymeric coating (not shown) may be applied to the metallic film 4 before applying a pressure sensitive transfer adhesive 6. The adhesive is not coated on as its solvent or drying would possibly attack the carrier 2 or embossable lacquer 3. Rather the adhesive is transferred already releasably adhered to a release paper (or film) 7, and the two surfaces are brought together under mild pressure of rollers to bond the pressure sensitive adhesive 6 firmly and irreversibly to the metallic film 4.

The bond strength between the pressure sensitive adhesive and the release paper 7 is less than that between the support 1 and the carrier 2. This allows the release paper 7 to be stripped away and the seal to be adhered in place. The support 1 may then be removed as the bond to the carrier 2 is weaker than the bonding among the carrier 2, embossable lacquer 3, metallic film 4 and pressure sensitive adhesive 6 (otherwise the tape would split apart).

The support 1 must be kept in place while the seal is being affixed because it is too soft to remain intact while being peeled from the release paper 7 over the pressure sensitive adhesive 6 without the support.

After removal of the support I the holographic layer is so weak that it rips apart on attempted peeling. The support 1 can be detached without pulling off the holographic layers. Overall the construction is very thin, typically the carrier and embossable layers taking up about 8-10 μm.

The release paper 7 could be siliconised paper, siliconised plastic, or releasable plastic such as polyester (if necessary surface treated), polythylene, polypropylene or the like. Plastic is useful since it allows the completed seal to be cut with a hot wire during plastic security bag manufacture. The Tg of the thermoplastic release layer will not usually be greater than 180° C. to allow hot wire cutting. The completed material can then be cut into reels or sheets for use as tape or individual labels. The release paper 7 may be partially slit.

As a variant the adhesive can be supplied in a patterned format, covering at least half of the available surface. The advantage of this is that tearing attempts will encounter differential adhesion. It is however somewhat of a disadvantage as the adhesive pattern can be seen against the holographic layer where the level changes. If patterned adhesive is to be used then the adhesive has to be placed in tramline fashion to span where the slitting knives will cut, otherwise the seal will destruct on slitting. In between the tramline's partial coverage a series of small blocks may be used.

The patterned adhesive gives differential failure variation of the seal. The seal described above breaks down readily on tampering, especially peeling. This breakdown can be enhanced by providing some irregularity in the flap of a bag being sealed, e.g. by serrating the edge of the flap. Regular failure to a geometric design is attractive but security can be enhanced by providing greater degrees of irregularity than simply by serrations. This can be achieved by placing a pattern of adhesive using patterned adhesive printing rollers. Either the adhesive is laminated in place rather than coated or the bond between the continuous adhesive and the metal is broken by printing a release coating onto the metal in a patterned form.

Figure 4:
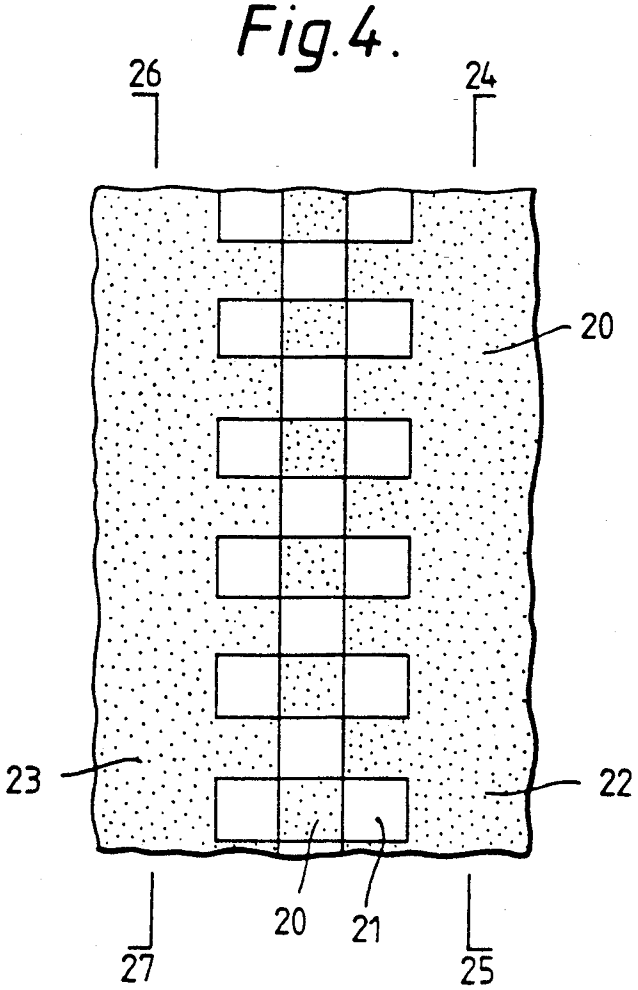
FIG. 4 illustrates a patterned adhesive for use with seal of FIG. 1 or FIG. 3.

FIG. 4 illustrates a patterned adhesive for use on a seal, the adhesive layer being arranged with adhesive areas 20 and non-adhesive areas 21. Two longitudinally uninterrupted tracks of adhesive 22 and 23 are provided where the tape is to be slit along lines 24–25 and 26–27 so as to prevent the soft coatings prematurely detaching.

The net effect is that when the support is peeled away those areas with adhesive are kept affixed to the substrate whilst those areas which are adhesive free are pulled by the carrier. The weak layers are therefore subjected to contrary forces and as the adhesion to adhesive and adhesion to the carrier are greater than the cohesion and adhesion of the carrier and embossable layers, these layers tear irregularly and cannot be reinstated.

The adhesive pattern also causes local variation in the thickness of the seal and this effect manifests itself in the holographic layer. This is otherwise completely flat but it is tilted by the adhesive.

Thus, patterned adhesives may be used where extra breakdown and tamper evidence is required. Solvent readily wicks under the coatings where there is no adhesive and because of the differential thermal conductivity of the structure, rapid cooling and heating might result in additional visible changes to the holographic image.

Another adaptation is to print a security bag with a patterned releasable flexographic ink where the seal is to be sealed. The pattern is applied by standard printing techniques and when the seal is peeled away by trying to lift it, for example with adhesive tape, the holographic layer tears in the pattern of the ink. The ink may be made to have release properties by including wax or other compatible low surface energy material.

In a further variant the corona field intensity may be varied across the web so as to provide differential adhesion.

On freezing in a freezer at −10° C. or lower temperature, according to the adhesive's properties the adhesive 6 will not debond from the substrates which have been used because of the choice of adhesive. The adhesive 6 has a low hardening temperature. On regaining room temperature no deterioration of holographic quality need be evident. On prolonged freezing or on very low temperature challenge such as at liquid nitrogen temperatures the hologram will irreversably deteriorate as thermal stresses develop between the securely bonded layers. Additionally it is thought that the presence of ice crystals forming within the holographic structure contribute to the effect. The aluminum layer appears to lose reflectance and this is readily noticeable.

The seal, which may be a continuous tape or comprise individual labels, is applied to a flat surface for example to protect an underlying feature, over the joint between two flat overlapping surfaces such as a bag flap or envelope flap, or over a short gap in a surface. The pressure sensitive adhesive will be varied depending on the end use.

The seal may be used as an edge seal for example spanning part of one edge of a photograph or visa affixed to a passport page or to seal a gap completely, for example security bag flaps.

The fragility of the holographic layers means that the seal does not provide a significant degree of strength to the area being sealed. Thus in security bags which have a flap which is folded and sealed against the body of the bag, there is generally a separate adhesive strip which provides a strong bond. This adhesive may be a double sided adhesive strip protected by a removable release layer. After the flap is sealed in position the adhesive strip will not normally be visible even though it may have a tamper indicating construction.

Although the seal is weak when the support 1 is left in position as will commonly be the case, the support 1 adds to the stress resistance of the holographic layer so that the seal is able to withstand minor flexing without damage. The support 1 also provides scuff resistance. If the support 1 is removed the carrier 2, which is tougher than the embossable lacquer, will provide limited impact protection.

A stronger version of security seal can be made for example for use for lamination or sealing in place of passport photographs. This requires that there is a permanent backing which is not releasable. In practice this is done by using polyester as the carrier, which has been surface treated with a corona discharge so that it bonds strongly to the coating. The soft embossable lacquer 3 is then between the strong pressure sensitive adhesive 6 and the carrier 2. On peeling there will be metal 4 to embossable lacquer 3 failure or cohesive failure of the embossable lacquer 3.

While complete metallisation can be used for this seal for some purposes, partial metallisation has to be used for the passport photograph overlaminate application to allow the photograph to be seen.

The passport overlaminate application has anticounterfeit and antiforgery properties. It possesses strong bonding with clear tamper resistance.

The seal may be supplied in lengths so that it can be bound into a passport book, next to the photograph page. The release paper which is not be stitched would be peeled off to reveal the adhesive which would then be smoothed over the page holding the holder's photograph. The seal may be used to seal the edge of a visa and could be signed.

The seal is designed to be resistant to freezing and high temperature attack as well as solvent or chemical eg alkali solution attack The seal if peeled causes irreversible irregular splitting of the soft holographic layers.

Figure 3:
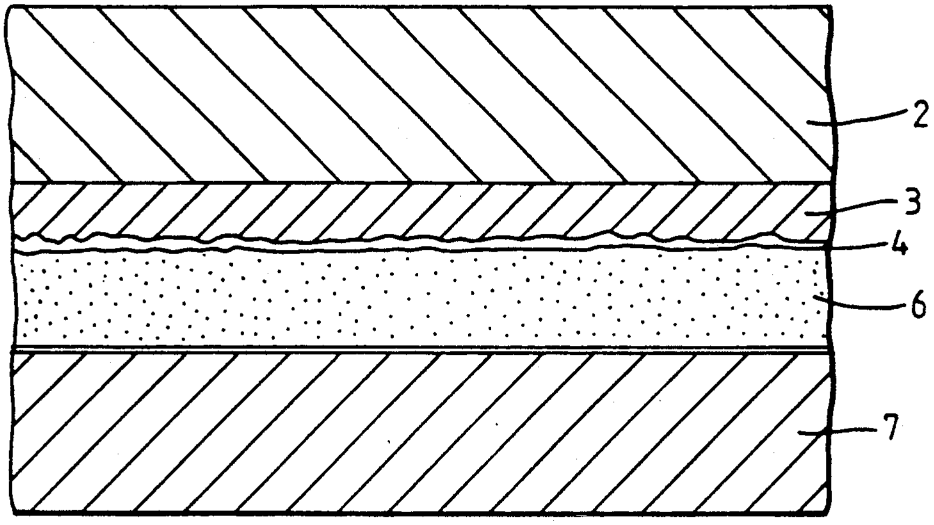
FIG. 3 is a schematic cross-section of a second embodiment of the seal.

An example of a higher strength seal for use with security bags is shown in FIG. 3. A transparent biaxially orientated polyester film 2, which may be between 19 μm and 50 μm thick, in this case 23 microns, was corona treated at approximately 50 dynes per centimetre to provide a surface on which the subsequent coating would exhibit clinging engagement.

To the corona treated surface of the carrier 2 a transparent coating of embossable lacquer 3 of the aforementioned type is then applied at for example 8 microns dry thickness and gently dried. The lacquer may be applied from a volatile solvent which is subsequently removed, at a thickness of between 7 μm and 12 μm.

A holographic pattern is then imparted to the surface of this lacquer 3, the holographic pattern comprising a series of abutting individual images separated by small plain margins. The surface of the lacquer 3 may be printed with a thin ink layer in a fine pattern. Embossing is undertaken under heat and pressure against a nickel shim which holds the holographic pattern on its surface at a temperature about 20° C. degrees above the Tg of the lacquer, approximately 80° C. to 110° C.

The embossed composite film is then metallised either completely or partially (to allow transparency), with aluminium under vacuum to deposit a layer of metal 4 approximately 20 μm thick.

To the surface of a roll of corona treated polypropylene film 7 is applied National Adhesives acrylic pressure sensitive adhesive Type 380-2819 or 1825 at a dry thickness of approximately 12 microns. This is dried to form the pressure sensitive adhesive layer 6 which is then rolled against the metallised composite film under mild pressure to provide the final seal. This is then slit into rolls and at the same time the release layer covering the adhesive is provided with a longitudinal tearing line to allow part of the adhesive to be made available for affixing the seal to a security bag.

The adhesion between this surface of the carrier 2 and the embossable lacquer 3 being sufficient to allow for manufacturing and automated seal affixing stresses. The adhesion between the carrier 2, embossable lacquer 3, metal layer 4 and the adhesive 6 is greater than that between the pressure sensitive adhesive 6 and its release paper 7. The seal can be affixed to a substrate by removing the pressure sensitive adhesive's release paper 7.

This seal may then be affixed in a continuous security bag manufacturing line to the surface of a thermoplastic security bag. Individual bags rom the continuous strip by means of a hot wire or guillotine which cuts and seals the bag edges and simultaneously cuts the security seal.

Figure 2:
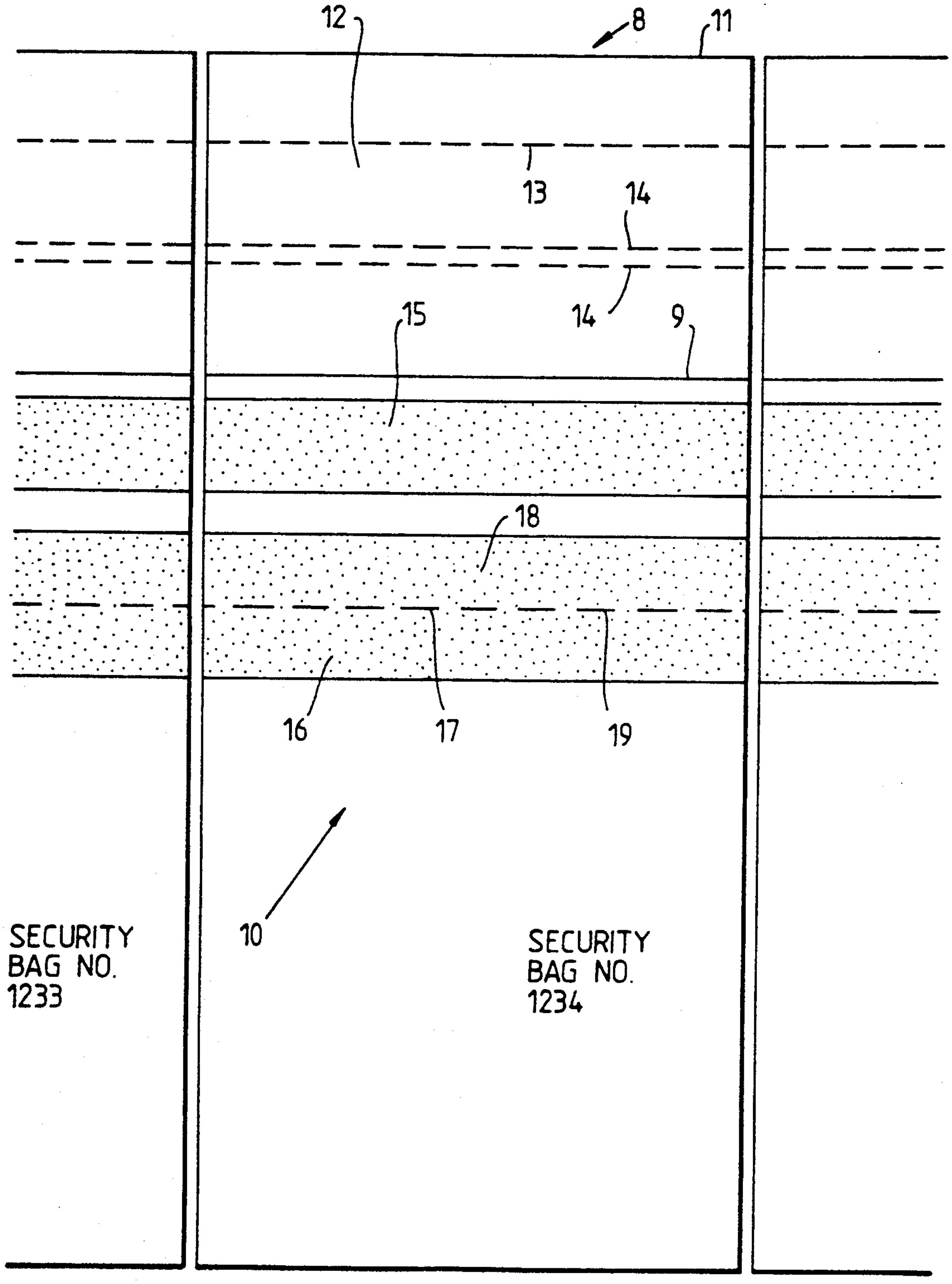
FIG. 2 illustrates manufacture of security bags incorporating the seal of FIG. 1.

FIG. 2 illustrates a continuous series of security bags bearing the seal of the invention, the bags having been vertically edge sealed by a hot wire which has cut through the thermoplastic bag material as well as the structural adhesive and the holographic security tape.

A roll of heat sealable plastic film 8 such as opaque polypropylene, suitable for making security pouches, longitudinally printed on the outside with the agent's name, is folded longitudinally on film transporters such that an edge 9 of an upper surface 10 does not extend as far as another edge 11 of a lower surface 12. The flap portion comprises a numbered section (the number is on the other side of the flap) detachable along a perforated line 13 when the bag is about to be holographically sealed. The flap has a series of perforations 14 to cause tearing on tampering.

Individual bag shapes are then prepared by cutting lengths of this continuous assembly with a heated plastic wire (orthogonal to the direction of the seal). This will also have the effect of sealing the edges of the bag. Alternatively, the edges of the bag may be heat sealed together to provide edge bands which are then cut in the middle of the bands with a hot wire or knife.

The bag, any detachable flap and optionally the seal may be numbered, for example by ink jet printing, to provide individuality to the bags.

In use the numbered section is detached and the flap is folded at line 9 and affixed to the surface 10 with a strong double sided adhesive strip 15 bearing its thermoplastic release layer. Holographic security seal 16 of the type described above is affixed to the bag by the adhesive on one half 17 of the seal (following removal of half the protective layer) . The other half 18 of the seal still bears its protective layer so that the edge 13 may be sealed when the flap extends to its limit 19.

Security envelopes are used for the secure transport and storage of valuable items. By providing a holographic seal which is difficult for the criminal to reproduce and which cannot be substituted or broken and sealed, they are made more visibly tamper evident. The seal supplied may be 25 mm wide and the release paper or film has a longitudinal tearing line so that one side can be stripped off. The seal may be applied to the bags during their in-line manufacture.

In order to test the laminate shown in the drawing, delaminating tests have been carried out at several temperatures on the type of seal which has a removable support (FIG. 1). These are 70 degrees Celsius, ambient temperature of about 20° C., −50° C. and −180° C.

The test seal is applied to a polypropylene or other plastic pouch surface and picking off intact is attempted. While the support may be able to be removed without destruction of the optical layer, the seal could not be removed intact at any of these temperatures. On exposure to the high or very low temperature the optical structure was irreversibly deformed. This may occur because of the differential stresses inside the structure so that on freezing, say, the carrier contracts more than the other layers with the result that the internal stresses cause failure of the diffraction image. The construction exemplified with the materials above has not only withstood freezing to −50° C. with freon spray but has also withstood integral peeling after exposure to liquid nitrogen. We have found that with the above construction the polyvinyl butyral layer seems to contract much faster than the optical layers to which is firmly adhered with the result that the holographic seal visibly fragments.

The seal was also found to be resistant to removal or failed irreversably on exposure to cold water, hot water, steam, aqueous alkali, aqueous acid, common solvents such as methylated spirits, acetone, petroleum spirit, ethylacetate, peeling, bending. The seal was difficult to copy or alter.

This improvement is very significant indeed in maintaining the integrity of pouches or at least showing that a tamper condition has arisen.

Different grades of seal are suitable for different applications. A normal grade may be used for light duty labels (including crack back release), or tape for bags, envelopes, cassettes, small seals, or passport stickers. The heavier duty seal with lower temperature resistance is suitable for strips, tapes, and labels where more load resistance is required such as the passport photograph overlaminate which is partially metallised. The light duty patterned adhesive may be used for applications where extra breakdown and tamper evidence is needed. A heavy duty patterned adhesive may be used for strip seals, labels, bags envelopes, and containers.

The term "crack back" is used to indicate a method of applying labels in which the release paper fixed to the adhesive is sharply folded over a right angle causing the front of the label to project with its adhesive surface exposed. The adhesive engages substrate and the substrate then pulls the label off the release paper. Crack back is necessary for automated label applications. Additional transparent layers having a thickness of less than 12 microns may be added within the laminate. The seal of the invention may be used on envelopes which are designed to hold computer discs such as 5¼" or 3½" floppy discs. The seals may be numbered individually or in batches to provide enhanced levels of security. The seals may also be used to secure boxes containing magnetic recording media which are provided in reel form such as magnetic tape cartridges for use as computer storage media, video recording tapes, audio tapes and the like.

We claim:

1. A tamper resistant security seal comprising a laminate having a transparent carrier layer; an optical, diffraction pattern defining layer; and an adhesive layer for adhering the seal to a substrate, wherein an optical pattern defined by the optical, diffraction pattern defining layer is visible from outside the laminate, and wherein an attempt to tamper with the seal will cause an irreversible change in the optical pattern characterized in that the optical, diffraction pattern defining layer is formed by a polymeric layer permanently bonded, directly or indirectly, to the transparent carrier layer, such that any attempt to delaminate the carrier from the optical, diffraction pattern defining layer will irreversibly damage the optical pattern; in that the adhesive is a pressure sensitive adhesive; and in that the laminate is such that a reduction in temperature below 0° C. will cause one or both of (a) a contraction of the carrier layer more than the other layers such that there is an irreversible change in the optical pattern, and (b) an irreversible change in the optical pattern upon attempted removal of the seal from a substrate, subsequent to such a temperature reduction.

2. A seal according to claim 1, wherein the polymeric optical, diffraction pattern defining layer when heated causes the optical pattern to undergo an irreversible change.

3. A seal according to claim 1, wherein the laminate is constructed so that a reduction in temperature below −50° C. will cause one or both of (a) a contraction of the carrier layer more than the other layers such that there is an irreversible change in the optical pattern, and (b) an irreversible change in the optical pattern upon attempted removal of the seal from the substrate, subsequent to such a temperature reduction.

4. A seal according to claim 1 wherein the transparent carrier layer comprises a thermoplastic which is soluble in an inorganic solvent.

5. A seal according to claim 1, wherein the transparent carrier layer has a thickness in the range 2–4 microns.

6. A seal according to claim 1, wherein an additional support layer is provided removably bonded to the transparent carrier layer.

7. A seal according to claim 6, wherein the surface of the support layer has been corona treated to assist adhesion between itself and the transparent carrier layer.

8. A seal according to claim 6, wherein the combined thickness of the transparent carrier layer and additional support layer is in the range 8 μm to 12 μm.

9. A seal according to claim 6, wherein the support layer comprises a transparent film, for example biaxially oriented polyester film.

10. A seal according to claim 1, wherein the optical diffraction pattern defining layer comprises a transparent film forming polymeric coating and a metallic layer provided on the surface of the coating remote from the carrier layer.

11. A seal according to claim 10, wherein the transparent coating of the optical pattern defining layer has a dry thickness in the range 7–12 μm.

12. A seal according to claim 10, wherein the metallic layer has a thickness of about 20 nm.

13. A seal according to claim 1, wherein the optical pattern defining layer has a thickness of 4–12 μm.

14. A seal according to claim 1, wherein the optical pattern defining layer has a glass transition temperature (Tg) in the range 50° C. to 90° C.

15. A seal according to claim 1, wherein the optical pattern defining layer has a glass transition temperature (Tg) in the range 60° C. to 80° C.

16. A seal according to claim 1, wherein the material of the optical, diffraction pattern defining layer is susceptible to solvents for weakening the adhesive layer or delaminating the tape so as to cause an irreversible change in the optical pattern.

17. A seal according to claim 1, further comprising an additional, protective polymeric coating applied to the optical pattern defining layer between that layer and the adhesive layer.

18. A seal according to claim 1, having a thickness of 8–10 μm excluding any support layer.

19. A seal according to claim 1, further comprising a releasable, film forming protective layer over the adhesive layer.

20. A seal according to claim 19, wherein the protective layer is a plastics material.

21. A seal according to claim 20, wherein the releasable protective layer on the pressure sensitive adhesive comprises a thermoplastic having a glass transition temperature (Tg) of from 50° C. to 150° C.

22. A seal according to claim 19, wherein the releasable, protective layer is releasable in more than one section.

23. A seal according to claim 1 wherein the pressure sensitive adhesive retains its adhesive properties over a temperature range of −50° C. to +60° C.

24. A seal according to claim 1, wherein the pressure sensitive adhesive retains its adhesive properties over a temperature range of −30° C. to +60° C.

25. A seal according to claim 1 wherein the pressure sensitive adhesive retains its adhesive properties over a temperature range of −20° C. to +60° C.

26. A seal according to claim 1, wherein the pressure sensitive adhesive retains its adhesive properties over a temperature range of −10° C. to +60° C.

27. A seal according to claim 1, wherein the optical pattern defining layer is directly bonded to the carrier layer.

28. A tamper resistant security seal comprising a laminate having a transparent carrier layer; an optical, diffraction pattern defining layer; and an adhesive layer for adhering the seal to a substrate, wherein an optical pattern defined by the optical, diffraction pattern defining layer is visible from outside the laminate, and wherein an attempt to tamper with the seal will cause an irreversible change in the optical pattern wherein: the optical, diffraction pattern defining layer is formed by a polymeric layer permanently bonded to the transparent carrier layer, such that any attempt to delaminate the carrier from the optical, diffraction pattern defining layer will irreversibly damage the optical pattern; the adhesive is a pressure sensitive adhesive, and the adhesive layer defines a pattern of areas with and without adhesive; and a reduction in temperature below 0° C. will cause one or both of (a) a contraction of the carrier layer more than the other layers such that there is an irreversible change in the optical pattern, and (b) an irreversible change in the optical pattern upon attempted removal of the seal from a substrate, subsequent to such a temperature reduction.

* * * * *